(12) United States Patent
Barr et al.

(10) Patent No.: US 9,075,974 B2
(45) Date of Patent: Jul. 7, 2015

(54) SECURING INFORMATION USING ENTITY DETECTION

(75) Inventors: John Mathias Barr, Courtice (CA); Geon Hyuk Park, Mississauga (CA); Somit Gupta, Himachal Pradesh (IN)

(73) Assignee: Google Inc., Mountain View, CA (US)

( * ) Notice: Subject to any disclaimer, the term of this patent is extended or adjusted under 35 U.S.C. 154(b) by 258 days.

(21) Appl. No.: 13/557,854

(22) Filed: Jul. 25, 2012

(65) Prior Publication Data

US 2014/0029810 A1    Jan. 30, 2014

(51) Int. Cl.
*G06K 9/00* (2006.01)
*G06F 21/32* (2013.01)

(52) U.S. Cl.
CPC ............ *G06F 21/32* (2013.01); *G06K 9/00295* (2013.01)

(58) Field of Classification Search
None
See application file for complete search history.

(56) References Cited

U.S. PATENT DOCUMENTS

| 6,111,517 A | 8/2000 | Atick | |
|---|---|---|---|
| 2006/0210167 A1* | 9/2006 | Inoue et al. | 382/190 |
| 2010/0124363 A1 | 5/2010 | Ek | |
| 2010/0205667 A1 | 8/2010 | Anderson | |
| 2011/0317872 A1 | 12/2011 | Free | |
| 2011/0317917 A1 | 12/2011 | Free | |
| 2012/0104090 A1* | 5/2012 | Gross | 235/379 |
| 2013/0103943 A1* | 4/2013 | Hirsch et al. | 713/168 |

OTHER PUBLICATIONS

Transmittal of the International Search Report and the Written Opinion of the International Searching Authority, or the Declaration, issued in PCT/US2013/050524 on Oct. 4, 2013, 9 pages.
International Preliminary Report on Patentability for International Application No. PCT/US2013/050524, dated Jan. 27, 2015, 6 pages.

* cited by examiner

*Primary Examiner* — Daniel Mariam
(74) *Attorney, Agent, or Firm* — Fish & Richardson P.C.

(57) ABSTRACT

Methods, systems, and apparatus, including computer programs encoded on a computer-readable storage medium, and including a method are provided where the method includes receiving information from an image processing source that includes one or more images of a view area associated with a device, wherein the view area is an area located in front of a display screen associated with the device, wherein the view area enables one or more entities to view the display screen; determining one or more entities located within the view area based at least in part on the one or more images of the view area associated with the device; validating the one or more entities located within the view area; and when an entity within the view area is not validated, producing a security response.

66 Claims, 4 Drawing Sheets

SECURING INFORMATION USING ENTITY DETECTION

BACKGROUND

This specification relates to information security.

Face detection technology can be used to detect the presence and location of human faces in digital media. Various techniques can be used to detect the faces in the digital media. The digital media can be gathered by various devices, such as cameras or video recorders. The digital media can be processed off line or in real time in order to detect the human faces.

SUMMARY

In general, one innovative aspect of the subject matter described in this specification can be implemented in methods that include receiving information from an image processing source that includes one or more images of a view area associated with a device, where the view area is an area located in front of a display screen associated with the device, where the view area enables one or more entities to view the display screen; determining one or more entities located within the view area based at least in part on the one or more images of the view area associated with the device; validating the one or more entities located within the view area; and when an entity within the view area is not validated, producing a security response.

These and other implementations can each optionally include one or more of the following features. The image processing source can be a still image camera. The image processing source can be a video camera. Determining one or more entities can include detecting faces of the one or more entities. The method can further include adjusting an image area associated with the image processing source to substantially match a view area associated with the display screen. The view area associated with the screen can be an area in front of the screen where content is visible to entities and being defined by a height, width and depth. The depth can be defined as distance from the display screen.

Validating the one or more entities located within the view area can include comparing the one or more entities with one or more authorized entities. In some implementations, comparing the one or more entities with authorized entities can include comparing a face recognition score associated with an entity in the one or more entities with face recognition scores corresponding to one or more authorized entities to produce a match score, and where the entity is validated when the match score satisfies a specified threshold.

In some implementations, comparing the one or more entities with authorized entities can include comparing an image of an entity in the one or more entities with images of one or more authorized entities to produce a match score, where the entity is validated when the match score satisfies a specified threshold. The comparing can include evaluating corresponding features, e.g., facial features, that are in the image of the entity and the images of the one or more authorized entities. Some examples of facial features that can be compared include distance between the eyes, width of the nose, depth of the eye sockets, shape of cheekbones, and length of the jaw line.

Comparing the one or more entities with one or more authorized entities can be performed using one or more processors in the device. Comparing the one or more entities with authorized entities can be performed external to the device. Comparing can include sending the one or more images to a server and receiving a validation result from the server. An entity in the one or more entities can be validated when the entity matches an authorized entity. Validating the one or more entities can include detecting whether eyes associated with the one or more entities are directed at the display screen associated with the device.

Producing a security response can include displaying a warning on the display screen associated with the device, disabling the display screen associated with the device, displaying images of the one or more entities on the display screen associated with the device, displaying different content on the display screen associated with the device, displaying one or more of the one or more images of the view area on the display screen associated with the device, displaying a video of the one or more entities on the display screen associated with the device, or disabling a feature associated with the device. The feature can be an application.

Other embodiments of this aspect include corresponding systems, apparatus, and computer programs, configured to perform the actions of the methods, encoded on computer storage devices.

Particular implementations may realize none, one or more of the following advantages. Entities that are not authorized to view content (e.g., privacy-sensitive content) displayed in a view area of a device can be identified. Upon identifying unauthorized entities, a security response can be produced by the device. The security response can involve displaying a warning on the display screen, disabling the display screen, displaying images of the unauthorized entities on the display screen, or displaying videos of the unauthorized entities on the display screen. In particular, the security response can be produced in response to detecting a face of an unauthorized entity or detecting whether eyes associated with the unauthorized entities are directed at the display screen. In effect, a user can view content on a display screen associated with a device without having to shield the display screen from potential unauthorized persons that are located within viewing distance of the display screen.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Images of a view area can be captured using an image processing source (e.g., a camera) that is associated with a device (e.g., a mobile phone). The view area can be located in front of a display screen for the device, where entities (e.g., persons) located within the view area can view the display screen. A determination can be made as to whether entities that are located within the view area are authorized to be viewing the display screen. In particular, a security response (e.g., disabling of the display screen or providing a notification) can be produced when an entity that is located within the view area is not authorized to be viewing the display screen. As a result, it may be possible to detect and prevent unauthorized third-parties from viewing privacy-sensitive content that is presented on a display screen.

Figure 1:
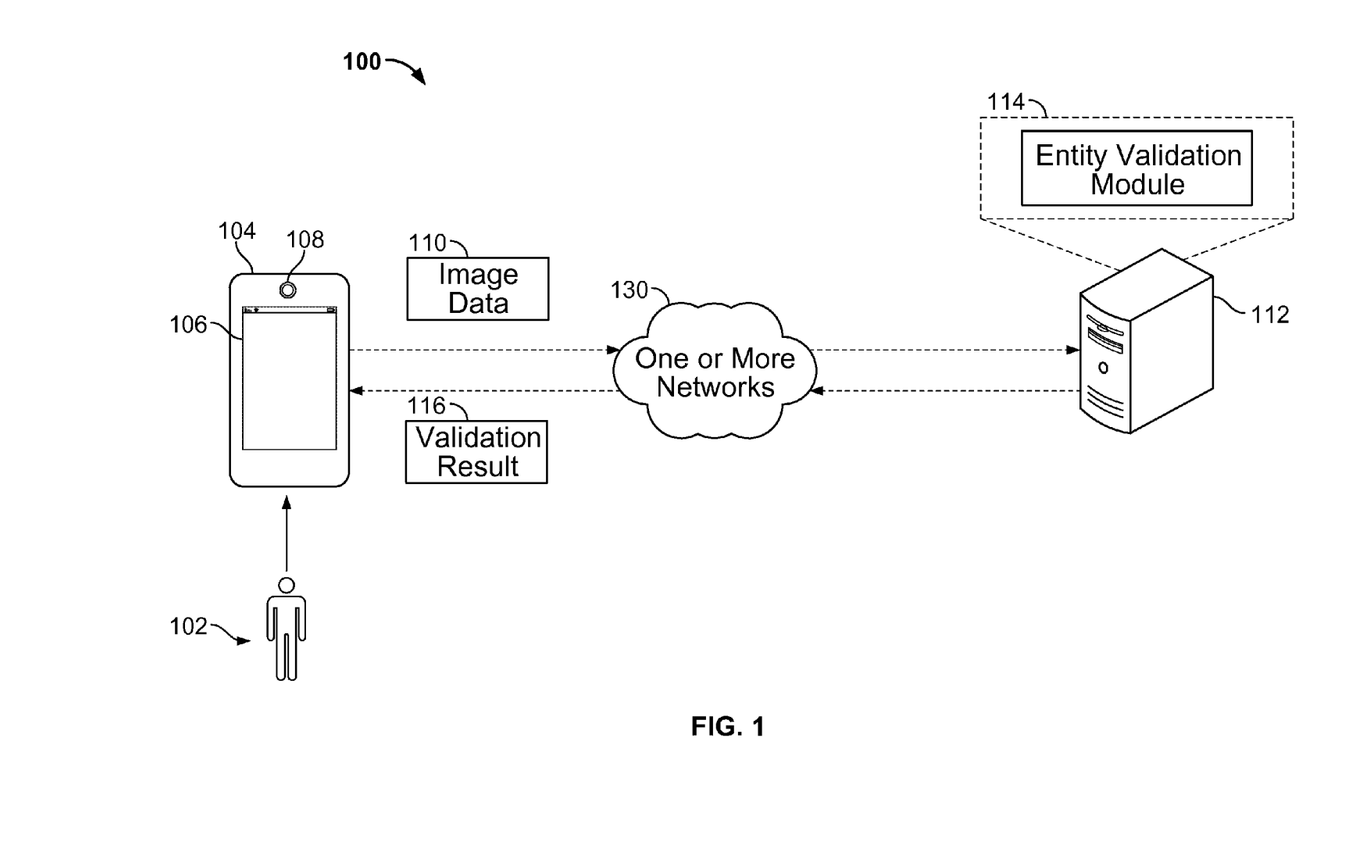
FIG. 1 is a diagram of an example system for securing information presented on a display screen.

FIG. 1 is a diagram of an example system 100 for securing information presented on a display screen. In general, the system 100 includes a device 104 (e.g., a mobile phone), a display screen 106 that is associated with the device 104, an image processing source 108, and an entity validation server 112.

A user 102 interacts with the device 104 to access content. The content can be presented on the display screen 106 that is associated with the device 104. The accessed content can include privacy-sensitive content (e.g., banking information, contact information, passwords). The device 104 can be of the form of a mobile telephone, a smart phone, a tablet device, a personal digital assistant, a laptop computer, a desktop computer, a video conference terminal, an automated teller machine (ATM) terminal, or other electronic device with a display.

An image processing source 108 (e.g., a camera) that is associated with the device 104 can be used to capture one or more images of a view area that is associated with the device 104. In some implementations, the image processing source can be built into the device 104, or alternatively, can be external to, but connected (e.g., by cable, wireless or other means) to the device 104. In some implementations, the view area is an area in front of the display screen 106, where the content that is presented on the display screen 106 is visible to the user 102 and to one or more other entities. In some implementations, the view area corresponds to a viewing area associated with the image processing source 108. In some implementations, the view area is a smaller field that represents an area in front of the device in which a person would be able to read content when displayed on the screen. The view area may change depending on an orientation of the device or external factors (e.g., sunlight or glare). For example, the view area might change in size, color, contrast, and/or aspect ratio.

In some implementations, the image processing source 108 is activated (i.e., to capture images for scanning purposes as discussed below) only when privacy-sensitive content it displayed. In some implementations, the image processing source 108 can be activated by the user or automatically.

The system 100 can determine that one or more entities are located within the view area based on the images of the view area that were captured by the image processing source 108. The images that are captured can be of the form of still images or a video. The device 104 can validate the one or more entities once a determination is made that one or more entities are located within the view area. The validation of entities can involve determining whether an entity in the one or more entities is or is not authorized to be viewing the display screen. In particular, the device 104 can produce a security response upon determining that an entity in the one or more entities is not authorized to be viewing the display screen.

In some implementations, the device 104 can communicate with an entity validation server 112 over one or more networks 130. The device 104 can provide the entity validation server 112 with image data 110 of the view area (e.g., one or more images of the view area that were captured by the image processing source 108 or frames from video data that was captured by the image processing source 108). The entity validation server 112 can process the image data 110 using, for example, an entity validation module 114 to produce a validation result 116. In some implementations, the validation result indicates whether an entity is or is not authorized to be viewing the display screen. In some implementations, the validation result includes a list of authorized entities that are detected and an indication of a number of un-authorized entities that are detected. In some implementations, the device does not seek validation of entities that were previously determined to be authorized in a given session (or within a predetermined prior time period).

The entity validation server 112 can communicate the validation result 116 to the device 104 over the one or more networks 130. Based on the validation result 116, the device 104 can determine whether an entity in the one or more entities is not authorized to be viewing the display screen. The device 104 can produce a security response in response to determining that an entity in the one or more entities is not authorized to be viewing the display screen. In some implementations, the functionality of the entity validation server 112 can be included in the device 104. In these examples, no transmission over the network 130 may be required.

As used by this specification, the network 130 may include, for example, a wireless cellular network, a wireless local area network (WLAN) or Wi-Fi network, mobile telecommunications network, such as a Third Generation (3G) or Fourth Generation (4G) mobile telecommunications network, a wired Ethernet network, a private network such as an intranet, a public network such as the Internet, or any appropriate combination thereof.

Figure 2:
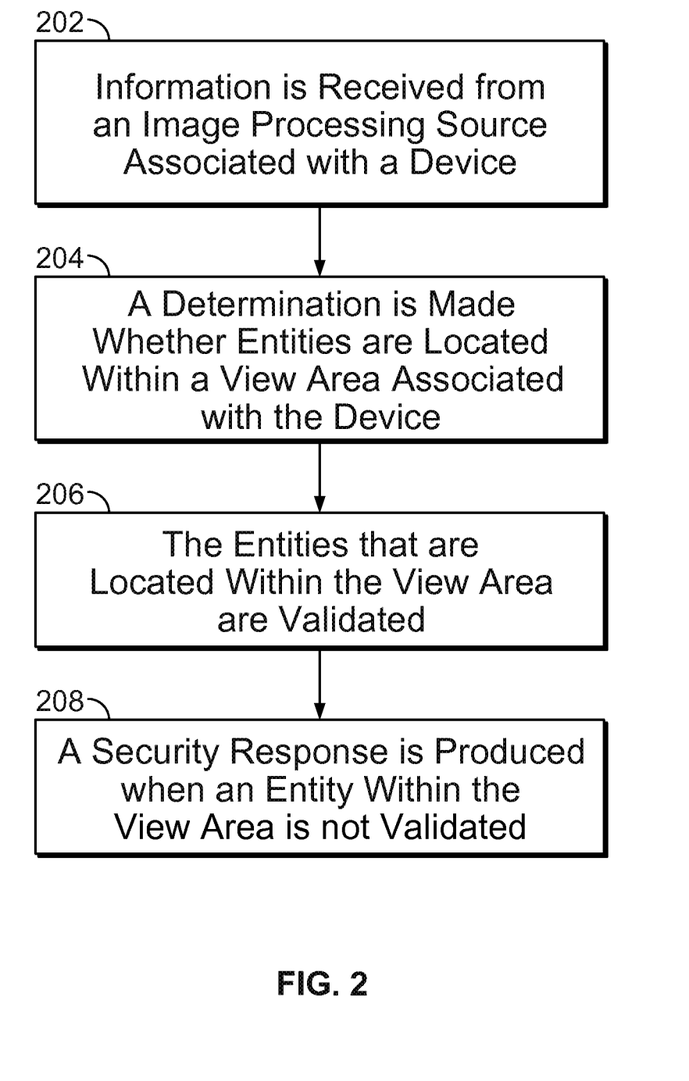
FIG. 2 is a flowchart of an example process for securing information presented on a display screen.

FIG. 2 is a flowchart of an example process 200 for securing information presented on a display screen. The process 200 can be performed by a computer system including one or more computers, such as, for example, the device 104 or the system 100, as shown in FIG. 1.

Information is received from an image processing source that is associated with a device (202). The device can be, for example, a mobile phone or an automated teller machine (ATM) that includes an image processing source. In some implementations, the image processing source is a still image camera.

The information received from the image processing source can include one or more images of a view area that is associated with the device. The view area can be an area that is located in front of a display screen associated with the device, where the view area allows one or more entities (e.g., persons) to view the display screen. For example, a user of the device that is located within the view area can view the display screen. In this example, one or more other non-users may also be within the view area (e.g., persons that are located next to the user) and therefore could also view the display screen.

In some implementations, an image area associated with the image processing source can be adjusted to substantially match a view area associated with the display screen. For example, the image area can be an area (e.g., a field or angle of view) that is capable of being imaged by the image processing source. In particular, the image processing source can capture images of entities that are located within the image area.

In some instances, the view area associated with the display screen can vary based on the positioning of the device. To accommodate such situations, the image area associated with the image processing source can be dynamically adjusted to match the view area so that entities that are capable of viewing the display screen can properly be imaged.

In some implementations, the view area associated with the display screen can be an area in front of the screen where content is visible to entities and can be defined by a height, width and depth (e.g., a height of two feet above and below the center of the screen, two feet left and right of the center of the screen, at a distance of 10 feet from the screen). In some implementations, when the display screen is transparent, the view area associated with the display screen can be an area that is behind the screen. In some implementations, the depth can be defined as a distance from the display screen. In some implementations, the image area associated with the image processing source can be adjusted to match the view area using a zoom or wide angle lens. For example, the device can adjust the image area (e.g., a field or angle of view) by adjusting a zoom-level for the image processing source.

In some implementations, the image processing source is a video camera, where the information received from the image processing source includes one or more video frames of a view area that is associated with the device, and where the system validates the entities within the view area based on the one or more video frames.

Returning to the method flow, a determination is made as to whether any entities are located within the view area (204). In some implementations, determining whether an entity is located within the view area includes detecting faces of the one or more entities. For example, the device can use face detection algorithms to identify locations of human faces in the one or more images. In performing this operation, the device can identify entities by detecting facial features of human faces while ignoring other non-entities (e.g., buildings, furniture, or trees). The system can also detect the presence of entities based on detecting, for example, an iris, a retina, body geometry, or other distinguishing feature.

The entities that are located within the view area are validated (206). In some implementations, validating the one or more entities located within the view area includes comparing the one or more entities with one or more authorized entities. For example, entities can be authorized to access particular content by a user having sufficient access privileges (e.g., an administrator). The system can be trained to recognize features (e.g., facial geometry, an iris, a retina, body geometry, or other features) associated with authorized entities and can assign one or more scores for the corresponding features. In some implementations, as opposed to specific validations, only a number of entities within the view area are identified (e.g., identifying a number of users including the device operator that are in the view area).

In some implementations, comparing the one or more entities with authorized entities includes comparing a face detection result associated with an entity in the one or more entities with face detection model corresponding to one or more authorized entities. The comparison may produce a match score. The entity can be validated when the match score satisfies a specified threshold. In some implementations, an entity in the one or more entities is validated when the entity matches an authorized entity.

Face recognition matches and/or scores for an entity can be determined using face detection algorithms. The face detection algorithms can measure one or more facial features (e.g., eyes, eye distance, nose, ears, ear distance, and lips) of the entity and, based in part on the measurements, can produce a face recognition model or score for each of the one or more facial features. The face detection algorithms can also produce a combined face recognition model or score that is based on all of the facial features.

In some implementations, comparing the one or more entities with one or more authorized entities is performed using one or more processors in the device (e.g., device 104). In such implementations, the device can validate the one or more entities by, for example, comparing face recognition models/scores for the one or more entities with face recognition models/scores for one or more authorized entities. In particular, the face recognition models/scores for the one or more authorized entities can be stored in the device.

In some other implementations, comparing the one or more entities with authorized entities is performed external to the device. In some implementations, the comparing includes sending the one or more images to a server and receiving a validation result from the server. For example, a device (e.g., device 104) can communicate to a server (e.g., entity validation server 112) face recognition models/scores for one or more entities. The server can compare the face recognition models/scores for the one or more entities with face recognition models/scores for one or more authorized entities to produce a validation result. The server can communicate to the device the validation result, which the device can use to, for example, determine whether to produce a security response.

In some implementations, the validation result is a binary value that indicates whether one or more entities included in the images are valid. The validation result can also include image data (e.g., a cropped image) of valid and/or invalid entities that were included in the one or more images communicated to the server.

The device can preprocess the one or more images before sending the images to the server. In some implementations, image preprocessing includes removing information from the images which the device has deemed irrelevant (e.g., background image data that does not include features directed to an entity). For example the device can identify locations of faces in the images and can send the identified portions of the images to the server.

In some implementations, image preprocessing includes adjusting the size and compression of an image (e.g., degree of lossy compression) based on the size of a detected entity face in the image. For example, if a face is located in an image but is at or below a threshold size (e.g., 150 pixels by 150 pixels), then the device can send the image of the face without adjusting the compression. In another example, if a face located in an image exceeds a threshold size (e.g., the face occupies the entire image), then the device can adjust the size and compression of the face so that the face fits within an image of the threshold size.

In some implementations, validating the one or more entities includes detecting whether eyes associated with the one or more entities are directed at the display screen associated with the device. The system can validate entities that have their eyes directed at the display screen and can skip validation of entities that do not have their eyes directed at the display screen. For example, the system can use one or more eye detection algorithms to detect whether eyes associated with the one or more entities are directed at the display screen and, based in part on the detection, validate the one or more entities. In this example, the system can skip validation of entities that do not have their eyes directed at the display screen and, instead, opt to validate entities that do have their eyes directed at the display screen.

In some implementations, the system validates entities at specified time intervals (e.g., every minute). In some other implementations, the system validates entities in real-time on an ongoing basis (e.g., the system constantly captures images of entities and validates the entities).

Returning to the method flow, a security response is produced when an entity within the view area is not validated (208). The security response can be an action that is taken to protect the content that is being presented on the display screen. In some implementations, producing a security response includes displaying a warning on the display screen associated with the device. For example, the warning can be displayed as an overlay to the content being presented on the display screen and can indicate that the content being presented on the display screen is no longer being displayed in a secured setting.

In some implementations, producing a security response includes disabling the display screen associated with the device. For example, the device can turn the display screen off so that no content is visible on the display screen. In some implementations, the security response includes displaying images of the one or more entities on the display screen associated with the device. For example, images of entities (e.g., images of entity faces) can be displayed on the display screen to indicate to a device user the entities that were detected within the view area associated with the device.

In some implementations, producing a security response includes displaying different content on the display screen associated with the device. For example, the system can display privacy-insensitive content (e.g., a screen saver) on the display screen to prevent others from viewing the content that was previously being displayed on the display screen.

In some implementations, producing the security response further includes displaying one or more of the one or more images of the view area on the display screen associated with the device. For example, the system can display images of the entire view area that was imaged, including one or more entities located within the view area and their accompanying surroundings. In some implementations, producing a security response includes displaying a video of the one or more entities on the display screen associated with the device.

In some implementations, producing a security response includes disabling a feature associated with the device. For example, the device can lock the display screen so that privacy-sensitive content cannot be seen on the display screen. In some implementations, the disabled feature is an application (e.g., an online banking application).

Figure 3A:
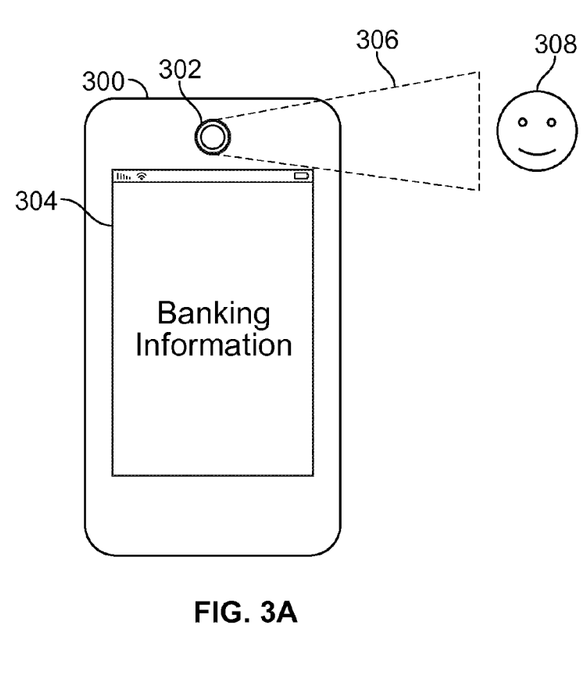
FIG. 3A illustrates an interaction between an example device and an entity.

FIG. 3A illustrates an interaction between an example device 300 and an entity 308. The device 300 includes an image processing source 302 and a display screen 304. The image processing source 302 can capture images and videos of a view area 306 associated with the device 300, where the view area 306 is an area that is located in front of the display screen 304.

In FIG. 3A, the entity 308 is an entity that is interacting with the device 300 to access privacy-sensitive content (e.g., banking information). The image processing source 302 can capture images of the entity 308 that is located within the view area 306 prior to the display of privacy-sensitive content on the display screen 304. The device 300 can validate the entity 308 using the images captured by the image processing source 302. The device 300 can use the validation result to determine whether a security response should be produced.

The device 300 can determine that the entity 308 is an authorized entity that is located within the view area 306 based on the validation result. In response to determining that the entity 308 present within the view area 306 is an authorized entity, the device 300 can present the accessed privacy-sensitive content on the display screen 304.

Figure 3B:
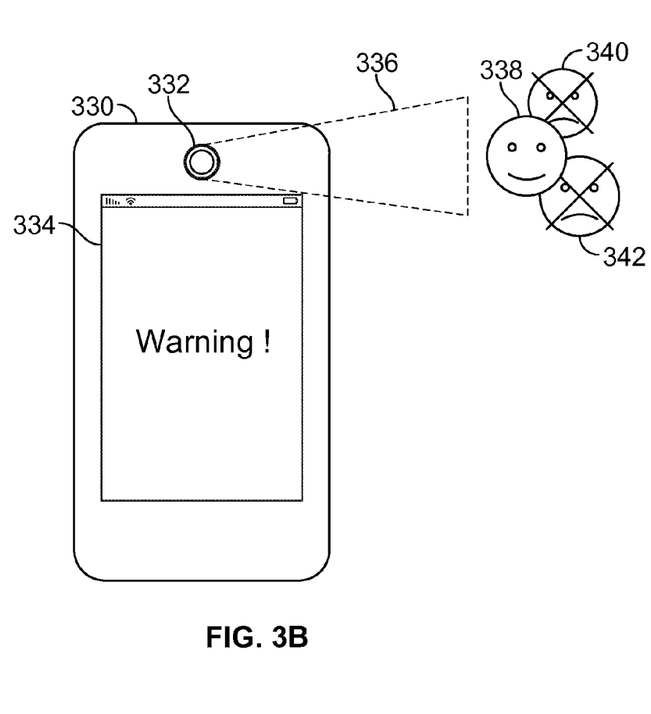
FIG. 3B illustrates an interaction between an example device and multiple entities.

FIG. 3B illustrates an interaction between an example device 330 and entities 338, 340, and 342. The device 330 includes an image processing source 332 and a display screen 334. The image processing source 332 can capture images and videos of a view area 336 associated with the device 330, where the view area 336 is an area that is located in front of the display screen 334.

In FIG. 3B, the entity 338 is an entity that is interacting with the device 330 to access privacy-sensitive content. The entities 340 and 342 are shown as other entities that are located within the view area 336, where the entities 340 and 342 are able to view content that is being displayed on the display screen 334.

The image processing source 332 can capture images of entities 338, 340, and 342 that are located within the view area 336 prior to the display of privacy-sensitive content on the display screen 334. The device 330 can validate the entities 338, 340, and 342 using the images captured by the image processing source 332. The device 330 can use the validation result to determine whether a security response should be produced.

The device 330 can determine that the entity 338 is an authorized entity and that entities 340 and 342 are unauthorized entities based on the validation result. In response to determining that unauthorized entities 340 and 342 are present within the view area 336, the device 330 can produce a security response (e.g., a warning message) to prevent the unauthorized entities 340 and 342 from viewing the privacy-sensitive content.

Figure 4:
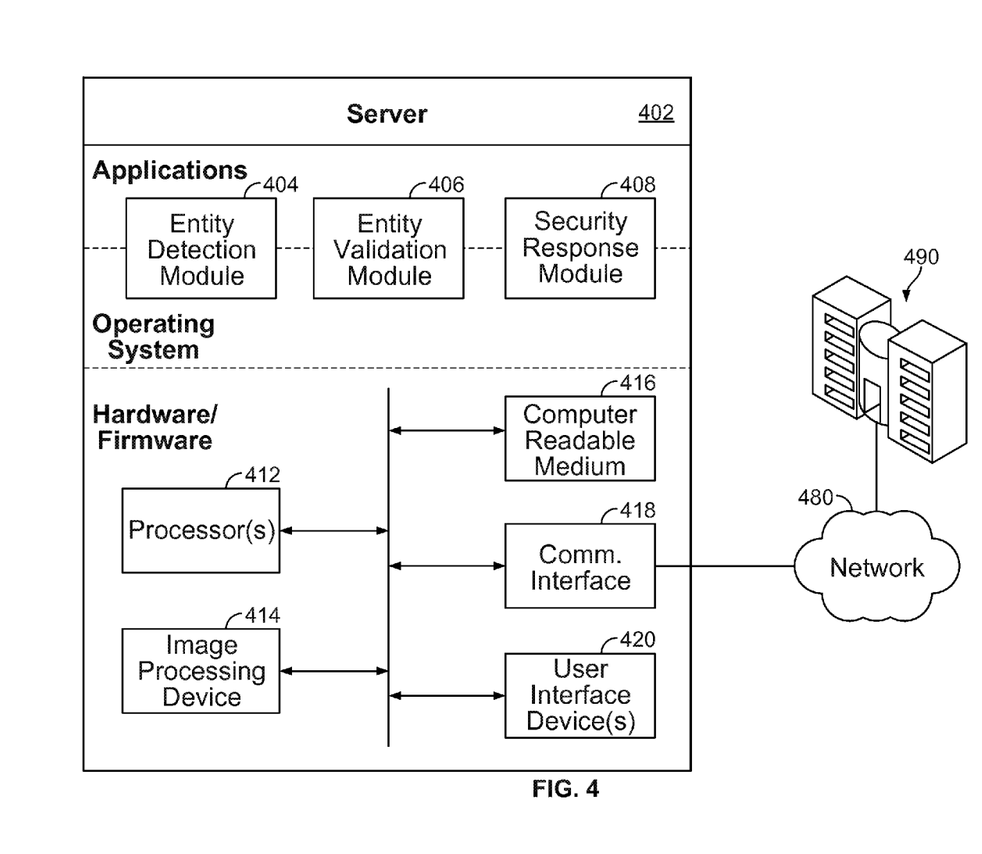
FIG. 4 is a schematic diagram of an example system.

FIG. 4 is a schematic diagram of an example server 402. The server 402 is optionally connected to one or more user or client computers 490 (e.g., device 104) through a network 480. The server 402 consists of one or more data processing apparatuses. While only one data processing apparatus is shown in FIG. 4, multiple data processing apparatus can be used. The server 402 includes various software modules, e.g. executable software programs or libraries, including an entity detection module 404, an entity validation module 406, and a security response module 408. Although several software modules are illustrated, there may be fewer or more software modules. Moreover, the software modules can be distributed on one or more data processing apparatus connected by one or more networks or other suitable communication mediums.

The server 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some implementations, the processor 412 is a single or multi-threaded processor. Each processor 412 is capable of processing instructions stored on the computer readable medium 416 or on a storage device such as one of the additional devices 414. The server 402 uses its communication interface 418 to communicate with one or more client computers 490, for example, over a network 480.

Examples of user interface devices 420 include a display, a camera, a speaker, a microphone, a tactile feedback device, a keyboard, and a mouse. The server 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) or LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, at a device during a time when a user is engaged in a session with the device, a request to access content that is identified as privacy-sensitive content;
   in response to receiving the request to access the privacy-sensitive content, receiving information from an image processing source that includes one or more images of a view area associated with the device, wherein the view area associated with the device is an area located in front of a display screen associated with the device, wherein the view area associated with the device enables one or more entities to view contents displayed on the display screen;
   determining that one or more entities are located within the view area associated with the device based at least in part on the one or more images of the view area associated with the device;
   validating the one or more entities located within the view area associated with the device; and
   when an entity within the view area associated with the device is not validated, producing a security response in response to the request to access the privacy-sensitive content.

2. The method of claim 1, wherein the image processing source is a still image camera.

3. The method of claim 1, wherein the image processing source is a video camera.

4. The method of claim 1, wherein determining that one or more entities are located within the view area associated with the device includes detecting faces of the one or more entities that are located within the view area associated with the device.

5. The method of claim 1, comprising adjusting an image area associated with the image processing source to substantially match the view area associated with the device.

6. The method of claim 5, wherein the view area associated with the device is defined by a height, width and depth.

7. The method of claim 6, wherein the depth is defined as distance from the display screen associated with the device.

8. The method of claim 1, wherein validating the one or more entities located within the view area associated with the device comprises comparing the one or more entities located within the view area associated with the device with one or more authorized entities.

9. The method of claim 8, wherein comparing the one or more entities located within the view area associated with the device with the one or more authorized entities includes comparing a face recognition score associated with an entity in the one or more entities located within the view area associated with the device with a face recognition score corresponding to an authorized entity in the one or more authorized entities to produce a match score, and wherein the entity is validated when the match score satisfies a specified threshold.

10. The method of claim 8, wherein comparing the one or more entities located within the view area associated with the device with the one or more authorized entities is performed using one or more processors in the device.

11. The method of claim 8, wherein comparing the one or more entities located within the view area associated with the device with the one or more authorized entities is performed external to the device.

12. The method of claim 11, comprising sending the one or more images of the view area associated with the device to a server and receiving a validation result from the server.

13. The method of claim 1, wherein an entity in the one or more entities located within the view area associated with the device is validated when the entity matches an authorized entity.

14. The method of claim 1, wherein validating the one or more entities located within the view area associated with the device comprises determining that eyes associated with at least one of the one or more entities located within the view area associated with the device are directed at the display screen associated with the device.

15. The method of claim 1, wherein producing the security response in response to the request to access the privacy-sensitive content comprises displaying a warning on the display screen associated with the device.

16. The method of claim 1, wherein producing the security response in response to the request to access the privacy-sensitive content comprises disabling the display screen associated with the device.

17. The method of claim 1, wherein producing the security response in response to the request to access the privacy-sensitive content comprises displaying images of the one or more entities located within the view area associated with the device on the display screen associated with the device.

18. The method of claim 1, wherein producing the security response in response to the request to access the privacy-sensitive content comprises displaying different content than the privacy-sensitive content on the display screen associated with the device.

19. The method of claim 1, wherein producing the security response in response to the request to access the privacy-sensitive content comprises displaying one or more of the one or more images of the view area associated with the device on the display screen associated with the device.

20. The method of claim 1, wherein producing the security response in response to the request to access the privacy-sensitive content comprises displaying a video of the one or more entities located within the view area associated with the device on the display screen associated with the device.

21. The method of claim 1, wherein producing the security response in response to the request to access the privacy-sensitive content comprises disabling a feature associated with the device.

22. The method of claim 21, wherein the feature is an application.

23. A system comprising:
one or more processors;
memory coupled to the one or more processors and operable for storing instructions, which, when executed by the one or more processors, causes the one or more processors to perform operations, comprising:
receiving, at a device during a time when a user is engaged in a session with the device, a request to access content that is identified as privacy-sensitive content;
in response to receiving the request to access the privacy-sensitive content, receiving information from an image processing source that includes one or more images of a view area associated with the device, wherein the view area associated with the device is an area located in front of a display screen associated with the device, wherein the view area associated with the device enables one or more entities to view contents displayed on the display screen;
determining that one or more entities are located within the view area associated with the device based at least in part on the one or more images of the view area associated with the device;
validating the one or more entities located within the view area associated with the device; and
when an entity within the view area associated with the device is not validated, producing a security response in response to the request to access the privacy-sensitive content.

24. The system of claim 23, wherein the image processing source is a still image camera.

25. The system of claim 23, wherein the image processing source is a video camera.

26. The system of claim 23, wherein determining that one or more entities are located within the view area associated with the device includes detecting faces of the one or more entities that are located within the view area associated with the device.

27. The system of claim 23, wherein the operations comprise adjusting an image area associated with the image processing source to substantially match the view area associated with the device.

28. The system of claim 27, wherein the view area associated with the device is defined by a height, width and depth.

29. The system of claim 28, wherein the depth is defined as distance from the display screen associated with the device.

30. The system of claim 23, wherein validating the one or more entities located within the view area associated with the device comprises comparing the one or more entities located within the view area associated with the device with one or more authorized entities.

31. The system of claim 30, wherein comparing the one or more entities located within the view area associated with the device with the one or more authorized entities includes comparing a face recognition score associated with an entity in the one or more entities located within the view area associated with the device with a face recognition score corresponding to an authorized entity in the one or more authorized entities to produce a match score, and wherein the entity is validated when the match score satisfies a specified threshold.

32. The system of claim 30, wherein comparing the one or more entities located within the view area associated with the device with the one or more authorized entities is performed using one or more processors in the device.

33. The system of claim 30, wherein comparing the one or more entities located within the view area associated with the device with the one or more authorized entities is performed external to the device.

34. The system of claim 33, wherein the operations comprise sending the one or more images of the view area associated with the device to a server and receiving a validation result from the server.

35. The system of claim 23, wherein an entity in the one or more entities located within the view area associated with the device is validated when the entity matches an authorized entity.

36. The system of claim 23, wherein validating the one or more entities located within the view area associated with the device comprises determining that eyes associated with at least one of the one or more entities located within the view area associated with the device are directed at the display screen associated with the device.

37. The system of claim 23, wherein producing the security response in response to the request to access the privacy-sensitive content comprises displaying a warning on the display screen associated with the device.

38. The system of claim 23, wherein producing the security response in response to the request to access the privacy-sensitive content comprises disabling the display screen associated with the device.

39. The system of claim 23, wherein producing the security response in response to the request to access the privacy-sensitive content comprises displaying images of the one or more entities located within the view area associated with the device on the display screen associated with the device.

40. The system of claim 23, wherein producing the security response in response to the request to access the privacy-sensitive content comprises displaying different content than the privacy-sensitive content on the display screen associated with the device.

41. The system of claim 23, wherein producing the security response in response to the request to access the privacy-sensitive content comprises displaying one or more of the one or more images of the view area associated with the device on the display screen associated with the device.

42. The system of claim 23, wherein producing the security response in response to the request to access the privacy-sensitive content comprises displaying a video of the one or more entities located within the view area associated with the device on the display screen associated with the device.

43. The system of claim 23, wherein producing the security response in response to the request to access the privacy-sensitive content comprises disabling a feature associated with the device.

44. The system of claim 43, wherein the feature is an application.

45. A non-transitory computer storage medium encoded with a computer program, the program comprising instructions that when executed by data processing apparatus cause the data processing apparatus to perform operations comprising:

receiving, at a device during a time when a user is engaged in a session with the device, a request to access content that is identified as privacy-sensitive content;

in response to receiving the request to access the privacy-sensitive content, receiving information from an image processing source that includes one or more images of a view area associated with the device, wherein the view area associated with the device is an area located in front of a display screen associated with the device, wherein the view area associated with the device enables one or more entities to view contents displayed on the display screen;

determining that one or more entities are located within the view area associated with the device based at least in part on the one or more images of the view area associated with the device;

validating the one or more entities located within the view area associated with the device; and when an entity within the view area associated with the device is not validated, producing a security response in response to the request to access the privacy-sensitive content.

46. The non-transitory computer storage medium of claim 45, wherein the image processing source is a still image camera.

47. The non-transitory computer storage medium of claim 45, wherein the image processing source is a video camera.

48. The non-transitory computer storage medium of claim 45, wherein determining that one or more entities are located within the view area associated with the device includes detecting faces of the one or more entities that are located within the view area associated with the device.

49. The non-transitory computer storage medium of claim 45, wherein the operations comprise adjusting an image area associated with the image processing source to substantially match the view area associated with the device.

50. The non-transitory computer storage medium of claim 49, wherein the view area associated with the device is defined by a height, width and depth.

51. The non-transitory computer storage medium of claim 50, wherein the depth is defined as distance from the display screen associated with the device.

52. The non-transitory computer storage medium of claim 45, wherein validating the one or more entities located within the view area associated with the device comprises comparing the one or more entities located within the view area associated with the device with one or more authorized entities.

53. The non-transitory computer storage medium of claim 52, wherein comparing the one or more entities located within the view area associated with the device with the one or more authorized entities includes comparing a face recognition score associated with an entity in the one or more entities located within the view area associated with the device with a face recognition score corresponding to an authorized entity in the one or more authorized entities to produce a match score, and wherein the entity is validated when the match score satisfies a specified threshold.

54. The non-transitory computer storage medium of claim 52, wherein comparing the one or more entities located within the view area associated with the device with the one or more authorized entities is performed using one or more processors in the device.

55. The non-transitory computer storage medium of claim 52, wherein comparing the one or more entities located within the view area associated with the device with the one or more authorized entities is performed external to the device.

56. The non-transitory computer storage medium of claim 55, wherein the operations comprise sending the one or more images of the view area associated with the device to a server and receiving a validation result from the server.

57. The non-transitory computer storage medium of claim 45, wherein an entity in the one or more entities located within the view area associated with the device is validated when the entity matches an authorized entity.

58. The non-transitory computer storage medium of claim 45, wherein validating the one or more entities located within the view area associated with the device comprises determining that eyes associated with at least one of the one or more entities located within the view area associated with the device are directed at the display screen associated with the device.

59. The non-transitory computer storage medium of claim 45, wherein producing the security response in response to the request to access the privacy-sensitive content comprises displaying a warning on the display screen associated with the device.

60. The non-transitory computer storage medium of claim 45, wherein producing the security response in response to the request to access the privacy-sensitive content comprises disabling the display screen associated with the device.

61. The non-transitory computer storage medium of claim 45, wherein producing the security response in response to the request to access the privacy-sensitive content comprises displaying images of the one or more entities located within the view area associated with the device on the display screen associated with the device.

62. The non-transitory computer storage medium of claim 45, wherein producing the security response in response to the request to access the privacy-sensitive content comprises displaying different content than the privacy-sensitive content on the display screen associated with the device.

63. The non-transitory computer storage medium of claim 45, wherein producing the security response in response to the request to access the privacy-sensitive content comprises displaying one or more of the one or more images of the view area associated with the device on the display screen associated with the device.

64. The non-transitory computer storage medium of claim 45, wherein producing the security response in response to the request to access the privacy-sensitive content comprises displaying a video of the one or more entities located within the view area associated with the device on the display screen associated with the device.

65. The non-transitory computer storage medium of claim 45, wherein producing the security response in response to the request to access the privacy-sensitive content comprises disabling a feature associated with the device.

66. The non-transitory computer storage medium of claim 65, wherein the feature is an application.

* * * * *